US008423886B2

(12) United States Patent
Barrie et al.

(10) Patent No.: US 8,423,886 B2
(45) Date of Patent: Apr. 16, 2013

(54) SYSTEMS AND METHODS FOR DOCUMENT ANALYSIS

(75) Inventors: John M. Barrie, Berkeley, CA (US); Michael Kang, San Diego, CA (US); Luke Chambers, Livermore, CA (US); Christian Storm, Richmond, CA (US); Steven Golik, Oakland, CA (US); John Hartman, Oakland, CA (US)

(73) Assignee: iParadigms, LLC., Oakland, CA (US)

( * ) Notice: Subject to any disclaimer, the term of this patent is extended or adjusted under 35 U.S.C. 154(b) by 0 days.

(21) Appl. No.: 13/225,090

(22) Filed: Sep. 2, 2011

(65) Prior Publication Data

US 2012/0060081 A1    Mar. 8, 2012

Related U.S. Application Data

(60) Provisional application No. 61/379,944, filed on Sep. 3, 2010.

(51) Int. Cl.
*G06F 17/00* (2006.01)

(52) U.S. Cl.
USPC .......................................................... 715/230

(58) Field of Classification Search .................. 715/229, 715/230
See application file for complete search history.

(56) References Cited

U.S. PATENT DOCUMENTS

| | | | |
|---|---|---|---|
| 4,671,772 A | 6/1987 | Slade et al. | |
| 4,937,439 A | 6/1990 | Wanninger et al. | |
| 5,276,869 A | 1/1994 | Forrest et al. | |
| 5,315,504 A | 5/1994 | Lemble | |
| 5,452,442 A | 9/1995 | Kephart | |
| 5,627,748 A | 5/1997 | Baker et al. | |
| 5,706,452 A | 1/1998 | Ivanov | |
| 5,743,742 A | 4/1998 | Morrel-Samuels | |
| 5,781,732 A | 7/1998 | Adams | |
| 5,790,790 A | 8/1998 | Smith et al. | |
| 5,845,278 A | 12/1998 | Kirsch et al. | |
| 5,890,177 A | 3/1999 | Moody | |
| 6,029,167 A | 2/2000 | Evans et al. | |
| 6,088,702 A | 7/2000 | Plantz | |
| 6,119,124 A | 9/2000 | Broder et al. | |
| 6,122,643 A | 9/2000 | Paik | |
| 6,192,165 B1 | 2/2001 | Irons | |

(Continued)

FOREIGN PATENT DOCUMENTS

| | | |
|---|---|---|
| WO | 0007110 A1 | 2/2000 |
| WO | 0056055 A2 | 2/2000 |

(Continued)

OTHER PUBLICATIONS

Author Unknown, "Peer Review system is flawed scientists say." Jan. 2003, www.smh.com.au/articles/2003/01/17/1042520777393.html, 4 pages.

(Continued)

*Primary Examiner* — Laurie Ries
(74) *Attorney, Agent, or Firm* — Casimir Jones SC

(57) ABSTRACT

The present invention relates to systems and methods for the peer review, originality analysis, and contextual mark-up of formatted electronic documents. In particular, the present invention provides systems and methods that utilize layered peer review, originality analysis and contextual markup modules in one view. These systems and methods have many applications, including use for online editing and education.

14 Claims, 1 Drawing Sheet

U.S. PATENT DOCUMENTS

| | | |
|---|---|---|
| 6,201,948 B1 | 3/2001 | Cook et al. |
| 6,240,409 B1 | 5/2001 | Aiken et al. |
| 6,243,722 B1 | 6/2001 | Day et al. |
| 6,262,728 B1 | 7/2001 | Alexander |
| 6,263,121 B1 | 7/2001 | Melen et al. |
| 6,272,485 B1 | 8/2001 | Sragner |
| 6,282,698 B1 | 8/2001 | Baker et al. |
| 6,301,462 B1 | 10/2001 | Freeman et al. |
| 6,347,333 B2 | 2/2002 | Eisendrath et al. |
| 6,349,296 B1 | 2/2002 | Broder et al. |
| 6,356,909 B1 | 3/2002 | Spencer |
| 6,381,618 B1 | 4/2002 | Jones et al. |
| 6,385,590 B1 | 5/2002 | Levine |
| 6,405,197 B2 | 6/2002 | Gilmour |
| 6,471,521 B1 | 10/2002 | Dornbush et al. |
| 6,546,406 B1 | 4/2003 | DeRose et al. |
| 6,551,107 B1 | 4/2003 | Buckley |
| 6,584,466 B1 | 6/2003 | Serbinis et al. |
| 6,611,822 B1 | 8/2003 | Beams et al. |
| 6,651,071 B1 | 11/2003 | O'Brien |
| 6,658,423 B1 | 12/2003 | Pugh et al. |
| 6,678,500 B2 | 1/2004 | Helmick |
| 6,725,428 B1 | 4/2004 | Pareschi |
| 6,732,090 B2 | 5/2004 | Shanahan et al. |
| 6,778,979 B2 | 8/2004 | Grefenstette et al. |
| 6,820,075 B2 | 11/2004 | Shanahan et al. |
| 6,904,263 B2 | 6/2005 | Grudnitski et al. |
| 6,928,425 B2 | 8/2005 | Grefenstette et al. |
| 6,976,170 B1 | 12/2005 | Kelly et al. |
| 6,978,419 B1 | 12/2005 | Kantrowitz et al. |
| 6,996,604 B2 | 2/2006 | Banerjee et al. |
| 7,007,232 B1 | 2/2006 | Ross et al. |
| 7,058,516 B2 | 6/2006 | Mascarenhas |
| 7,062,220 B2 | 6/2006 | Haynes et al. |
| 7,155,157 B2 | 12/2006 | Kaplan |
| 7,210,938 B2 | 5/2007 | Packard |
| 7,263,655 B1 | 8/2007 | Carden |
| 7,284,191 B2 | 10/2007 | Grefenstette et al. |
| 7,356,188 B2 | 4/2008 | Venkatesan et al. |
| 7,496,632 B2 | 2/2009 | Chapman et al. |
| 7,577,938 B2 | 8/2009 | Bent et al. |
| 2001/0025296 A1 | 9/2001 | Narang |
| 2002/0029236 A1 | 3/2002 | Burgel |
| 2002/0054059 A1 | 5/2002 | Schneiderman |
| 2002/0068263 A1 | 6/2002 | Mishkin et al. |
| 2002/0068264 A1 | 6/2002 | Gu |
| 2002/0076674 A1 | 6/2002 | Kaplan et al. |
| 2002/0087560 A1 | 7/2002 | Bardwell |
| 2002/0132216 A1 | 9/2002 | Dohrmann |
| 2002/0133395 A1 | 9/2002 | Hughes et al. |
| 2002/0138590 A1 | 9/2002 | Beams et al. |
| 2002/0156632 A1 | 10/2002 | Haynes et al. |
| 2002/0184085 A1 | 12/2002 | Lindia et al. |
| 2003/0014400 A1 | 1/2003 | Siegel |
| 2003/0027121 A1 | 2/2003 | Grudnitski et al. |
| 2003/0033288 A1 | 2/2003 | Shanahan et al. |
| 2003/0061026 A1 | 3/2003 | Umpleby et al. |
| 2003/0061201 A1 | 3/2003 | Grefenstette et al. |
| 2003/0069877 A1 | 4/2003 | Grefenstette et al. |
| 2003/0130994 A1 | 7/2003 | Singh |
| 2004/0010557 A1 | 1/2004 | Chapman et al. |
| 2004/0115596 A1 | 6/2004 | Snyder |
| 2004/0153508 A1 | 8/2004 | Alcorn et al. |
| 2004/0167787 A1 | 8/2004 | Lynch et al. |
| 2004/0205130 A1 | 10/2004 | Banerjee et al. |
| 2004/0205448 A1 | 10/2004 | Grefenstette et al. |
| 2004/0261016 A1 | 12/2004 | Glass et al. |
| 2005/0015709 A1* | 1/2005 | Lavoie et al. ............... 715/500 |
| 2005/0022114 A1 | 1/2005 | Shanahan et al. |
| 2005/0027576 A1 | 2/2005 | Klipstein |
| 2005/0111762 A1* | 5/2005 | Mathew et al. ............... 382/309 |
| 2008/0052638 A1* | 2/2008 | Frank et al. ................... 715/808 |
| 2008/0077570 A1* | 3/2008 | Tang et al. ........................ 707/5 |
| 2009/0187817 A1* | 7/2009 | Ivashin et al. ................. 715/230 |
| 2009/0254867 A1* | 10/2009 | Farouki et al. ................ 715/853 |
| 2009/0307618 A1* | 12/2009 | Lawler et al. ................. 715/764 |
| 2010/0121812 A1* | 5/2010 | Helfman et al. ................ 706/54 |
| 2010/0156913 A1* | 6/2010 | Ortega et al. ................. 345/520 |
| 2010/0313114 A1* | 12/2010 | Colbran ........................ 715/230 |
| 2011/0128414 A1* | 6/2011 | Walker et al. ............. 348/231.99 |

FOREIGN PATENT DOCUMENTS

| | | |
|---|---|---|
| WO | 0027114 A2 | 5/2000 |
| WO | 0128644 A1 | 4/2001 |
| WO | WO01/42979 A1 | 6/2001 |

OTHER PUBLICATIONS

Brin, Sergey, "Copy Detection Mechanisms for Digital Documents." ACM 1995, pp. 398-409.

Chang et al. "Scientists Frustrated with Academic Journals can publish research online." Oct. 1, 2006.

EduTie.com et al. Aug. 2000 http://www.edutie.com, 2 pages.

Gehringer, Edward F., "Stragegies and Mechanisms For Electronic Peer Review." Oct. 18-21, 2000 ASSEE/IEEE Frontiers in Education Conference, Session F1B, pp. 2-7.

Guernsay, Lisa, "Journals see the Internet as a Tool in the Peer-Review System." Apr. 2, 1999, Chronicle of Higher Education, pp. 1-4.

Integriguard Web Page (Copyright 2000), 1 page.

Lin et al., "Web-Based peer assessment: feedback for students with various thinking styles." Jan. 20, 2001, Journal of Computer Assisted Learning, pp. 420-432.

Plagiarism Software for eleum; Downloaded Feb. 27, 2007 http://www.fdewb.unimaas.ni/eleum/plagiarism/plagiarism.htm, 14 pages.

Plagiarism.org web pages (copyright 1998-2001), 3 pages.

Plagiserve.com et al. Oct. 2001 http://web.archive.org/web/20011031085450/www.plagiserve.com/ps.htm., 26 Pages.

Rowland, Fytton et al., "The Peer Review Process." Jan. 2003., 16 pages.

Stoerger, Sharon et al., "Plagiarism" Oct. 2002, 45 Pages.

Sullivan et al., "Computer-Mediated Peer Review of Student Papers." Nov./Dec. 1998, Journal of Education for Business, pp. 117-121.

United States Department of Agriculture et al. "Peer Review User Guide" Nov. 2003., 14 pages.

\* cited by examiner

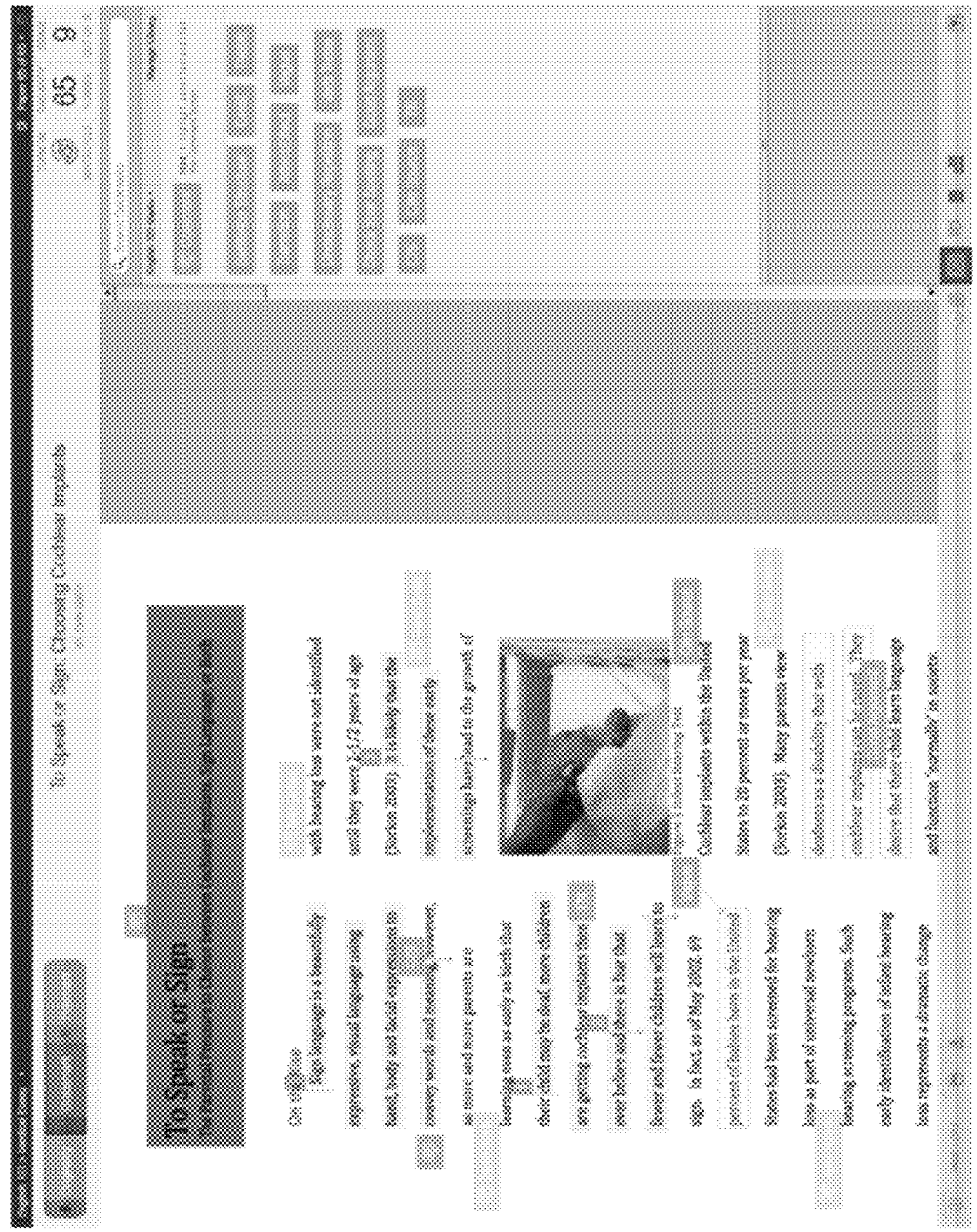

SYSTEMS AND METHODS FOR DOCUMENT ANALYSIS

This application claims priority to provisional application 61/379,944, filed Sep. 3, 2010, which is herein incorporated by reference in its entirety.

FIELD OF THE INVENTION

The present invention relates to systems and methods for the peer review, originality analysis, and contextual mark-up of formatted electronic documents. In particular, the present invention provides systems and methods that utilize layered peer review, originality analysis and contextual markup modules in one view. These systems and methods have many applications, including use for online editing and education.

BACKGROUND OF THE INVENTION

The Internet has permitted users with web browsers to easily exchange information over the Internet. Educational or academic materials, for example, may be distributed to users for taking an educational course on-line or for facilitating grading, peer review, and the like. In order for the online exchange of such materials to successfully replace or supplement in-classroom materials, users must be provided with various features so that the on-line system provides certain benefits over in-classroom models. Accordingly, a need exists for various features for an on-line educational system and related systems.

DESCRIPTION OF THE DRAWINGS

FIG. 1 shows an overview of the layered modules of embodiments of the present invention.

SUMMARY OF THE INVENTION

The present invention relates to systems and methods for the peer review, originality analysis, and contextual mark-up of formatted electronic documents. In particular, the present invention provides systems and methods that utilize layered peer review, originality analysis and contextual markup modules in one view. These systems and methods have many applications, including use for online editing and education.

Embodiments of the present invention provide systems and methods of using the system for document analysis, comprising a processor and software configured to a) receive documents over an electronic communication network and convert unformatted documents into image files, b) permit a user to add contextual markups to the image files wherein the contextual markups are images whose locations are overlaid onto each image of the image file (e.g., exactly onto), and wherein the image file is not modified, c) generate an originality report and highlight sections of the image file identified in the originality report as potentially containing plagiarized text, and d) display the image file on a display screen, wherein the image file simultaneously displays the contextual markups and the highlights. In some embodiments, the processor or software is further configured to store information (e.g., including but not limited to, identity of submitter, grade information, editorial comments, editorial rubrics, questions, or answers) pertaining to the received document in a database. In some embodiments, the documents are, for example, assignments, students' manuscripts, grant applications or journal manuscripts. In some embodiments, the contextual markups are, for example, editorial comments, peer reviewer comments, corrections, annotations, rubrics, symbols or comments added by the user. In some embodiments, the highlighting is glyph aware highlighting. In some embodiments, the glyph aware highlighting matches glyphs stored in a text database using the pixel-accurate coordinates of the image file. In some embodiments, the highlighting scales with zooming and is added across multiple lines or pages.

DEFINITIONS

To facilitate an understanding of the present invention, a number of terms and phrases are defined below:

As used herein, the term "glyph aware," for example "glyph aware highlighting" refers to highlighting added to graphemes of an image file that is directed to specific graphemes. In some embodiments, glyph aware highlighting utilizes a database of graphemes that maps to the image file.

As used herein, the term "grapheme" refers to a fundamental unit in a written language. Examples of graphemes include alphabetic letters, Chinese glyphs, numerical digits, punctuation marks, and the individual symbols of any of the world's writing systems. In the present specification, the terms "grapheme", "text" and "text characters" are used interchangeably.

As used herein, the term "glyph" refers to an element of writing (e.g., an individual mark on a written medium that contributes to the meaning of what is written.) A "grapheme" is made up of one or more "glyphs." In the present specification, the terms "glyph" and "character" are used interchangeably.

The term "system" is used to refer to a document management system (e.g., online), an example of which is described in the present specification. The term "database" is used to refer to a data structure for storing information for use by the system, and an example of such a data structure in described in the present specification.

The term "user" refers to a person using the systems or methods of the present invention. The term "instructor" refers to a person teaching or otherwise providing content or instruction for an on-line educational system. A person may be both a user and an instructor.

The term "assignments" refers to work to be completed by a user for an on-line course, and examples of assignments are provided below. Assignments may include work to be completed by a user without requiring responsive information sent to an instructor, and they may also include work to be completed by a user requiring responsive information. Assignments may also include or use learning tools.

As used herein, the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video discs (DVD), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein, the term "encode" refers to the process of converting one type of information or signal into a different type of information or signal to, for example, facilitate the transmission and/or interpretability of the information or signal. For example, image files can be converted into (i.e., encoded into) electrical or digital information. Likewise, light patterns can be converted into electrical or digital information that provides an encoded video capture of the light patterns.

As used herein, the term "hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein, the terms "World Wide Web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

As used herein, the term "web site" refers to a computer system that serves informational content over a network using the standard protocols of the World Wide Web. Typically, a Web site corresponds to a particular Internet domain name and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "HTML" refers to HyperText Markup Language that is a standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

As used herein, the term "HTTP" refers to HyperText Transport Protocol that is the standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET, causes the server to return the document or file located at the specified URL.

As used herein, the term "URL" refers to Uniform Resource Locator that is a unique address that fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "in electronic communication" refers to electrical devices (e.g., computers, processors, etc.) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein, the term "transmitting" refers to the movement of information (e.g., data) from one location to another (e.g., from one device to another) using any suitable means.

As used herein, the term "XML" refers to Extensible Markup Language, an application profile that, like HTML, is based on SGML. XML differs from HTML in that: information providers can define new tag and attribute names at will; document structures can be nested to any level of complexity; any XML document can contain an optional description of its grammar for use by applications that need to perform structural validation. XML documents are made up of storage units called entities, which contain either parsed or unparsed data. Parsed data is made up of glyphs, some of which form data, and some of which form markup. Markup encodes a description of the document's storage layout and logical structure. XML provides a mechanism to impose constraints on the storage layout and logical structure, to define constraints on the logical structure and to support the use of predefined storage units. A software module called an XML processor is used to read XML documents and provide access to their content and structure.

As used herein, the term "intermediary service provider" refers to an agent providing a forum for users to interact with each other (e.g., identify each other, make and receive assignments, etc). For example, an intermediary service provider may provide a forum for faculty members to create and distribute assignments to students in a class (e.g., by defining the assignment and setting dates for completion), or provide a forum for students to receive and respond to assignments such as peer review assignments. The intermediary service provider also allows, for example, users to maintain a portfolio of work submitted in response to all assignments for a particular class or project and for the collection of data (such as customized questions and rubrics) which can be used to supplement knowledge base data in a library of such data. In some embodiments, the intermediary service provider is a hosted electronic environment located on the Internet or World Wide Web.

As used herein, the term "client-server" refers to a model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

As used herein, the term "hosted electronic environment" refers to an electronic communication network accessible by computer for transferring information. One example includes, but is not limited to, a web site located on the world wide web.

DETAILED DESCRIPTION OF THE INVENTION

The present invention relates to systems and methods for the peer review, originality analysis, and contextual mark-up of formatted electronic documents. In particular, the present invention provides systems and methods that utilize layered peer review, originality analysis and contextual markup modules in one view. These systems and methods have many applications, including use for online editing and education.

Embodiments of the present invention provides system and methods for users to review (e.g., peer or instructor review), grade, comment on, check for originality and contextually mark-up a formatted manuscript, graph, image, spreadsheet, and the like, for the purposes of transmitting those reviews, grades, comments, and contextual commentaries to other individuals or groups or for archival purposes. For example, embodiments of the present invention provide systems and methods for instructors who would like to grade their students' manuscripts in a digital fashion. Benefits of the systems and methods described herein include, but are not limited to: 1) a digital record of all manuscript comments can be maintained and tracked; 2) an author's writing progress can be tracked over time by having a computer calculate statistics regarding the rubrics or comments inserted into the manuscript; 3) temporal efficiencies are created; 4) contextual markup can supplement static commentary; 5) originality can be assessed; and 6) reviews and grades can be normalized across multiple reviewers.

Embodiments of the present invention provide layered systems that overlay and simultaneously display the above described modules.

While much of the following description illustrates the invention through use of an educational environment, skilled artisans will understand that the invention is not so limited, and is generally applicable to a wide range of applications. Details of the peer review, originality analysis and contextual markup modules described herein can be found, for example, in U.S. Pat. Nos. 7,219,301 and 7,703,000; each of which is herein incorporated by reference in its entirety.

I. User Interface

In some embodiments, peer review, originality checking and contextual markup modules comprise a user interface operably connected to a computer processor in communication with computer memory. Computer memory can be used to store applications, along with a central data base including papers submitted for review, data for identifying subscribers and other data and applications. In some embodiments, access to the user interface is controlled through an intermediary service provider, such as, for example, a website offering a secure connection following entry of confidential identification indicia, such as a user ID and password, which can be checked against the list of subscribers stored in memory. Upon confirmation, the user is given access to the site. Alternatively, the user could provide user information to sign into a server which is owned by the customer and, upon verification of the user by the customer server, the user can be linked to the user interface.

The user interface can be used by a variety of users to perform different functions, depending upon the type of user. For purposes of embodiments of the present invention, there are generally at least three categories of users (although other users may also be defined and given access): sponsors, submitters, and reviewers. Sponsors are those who require or invite the submission of papers, and define the parameters of those papers, including content. In an academic environment, this category typically includes teachers or professors. Submitters are those who prepare and submit papers for review. In an academic environment, this typically includes students. Reviewers are those who review the submitted papers for quality, and for compliance with the parameters and criteria defined by the sponsor. In an academic environment, reviewers can be the teacher or professor of the class for which the paper was submitted, other teachers or professors (e.g., members of a thesis or dissertation committee), or students. Indeed, the practice of having students exchange and grade tests and quizzes in class has been a common practice. While some embodiments of the present invention are carried out in an academic setting, one skilled in the art will recognize that the present invention can also be applied to a variety of other peer review situations, such as, for example, evaluating papers for publication, and reviewing grant proposals.

Users generally access the user interface by using a remote computer, internet appliance, or other electronic device with access to the internet and capable of linking to an intermediary service provider operating a designated website (such as, for example, turnitin.com) and logging in. Alternatively, if elements of the system are located on site at a customer's location or as part of a customer intranet, the user can access the interface by using any device connected to the customer server and capable of interacting with the customer server or intranet to provide and receive information.

The user provides predetermined identification information (e.g., user type, email address, and password) which is then verified by checking a "central database" containing the names of all authorized users stored in computer memory. If the user is not found in the central database, access is not provided unless the "free trial" option has been selected, and then access is only provided to sample screens to enable the unknown user to evaluate the usefulness of the system. The central database containing the identification information of authorized users could be maintained by the intermediary service provider or by a customer. If the user is known (e.g., contained within the list of authorized users), the user will then be given access to an appropriate "home page" based on the type of user and the user ID which links to subscription information and preferences previously selected by the user. Thus, "home pages" with relevant information can be created for sponsors, submitters, and reviewers.

The login screen allows the user to select the type of user interface to be accessed. Such a choice is convenient where an individual user fits into more than one category of user. For example, where an individual user is both a faculty member and a student in a class, allowing the individual to choose the user type will bring up the appropriate interface screen. In situations where there can be no overlap, such a choice, while preferable, will not be necessary since the central database can include each individual user's user type and can automatically bring up the appropriate user interface screen when the user signs in and is recognized. The user may also be given the option of selecting a secure session.

In some embodiments, the steps of the process are carried out by the intermediary service provider, and the peer review, markup or originality report is generated and accessible to the sponsor through the user interface. However, some institutions may wish to maintain control over their student's papers. In such cases, it is possible to divide the processing between the customer's server and the intermediary service provider's server.

II. Peer Review Module

In some embodiments, systems and methods of embodiments of the present invention incorporate a peer review module. In some embodiments, peer review systems provide an opportunity for review of an author's work by peers or instructors or other reviewers.

In some embodiments, the sponsor selects a complete peer review assignment from a library of complete peer review assignments, or creates a new peer review assignment. To create a new peer review assignment, the sponsor selects the "create a new peer review assignment" icon.

The criteria for the peer review assignment can be established by the sponsor. These criteria include, but are not limited to, (1) identity of the paper assignment this peer review is to be paired with; (2) relevant dates such as, for example, a start date, a due date (e.g., the date by which the peer review must be completed and uploaded), a post date (e.g., the date when the results of the peer review will be available to interested parties), and possibly a reminder date (e.g., the date on which a reminder will be sent to the reviewers to remind them of the upcoming due date for the completion of the peer review assignment); (3) the method by which the papers will be distributed to the students/reviewers; (4) dissemination of ratings for the reviewed papers; and (5) keywords related to the assignment to enable the sponsor to access and review relevant topical questions to be answered by the reviewers stored in the central data base.

In some embodiments, the method by which papers are distributed to the students/reviewers is also selectable to allow the sponsor to determine whether papers are distributed to individuals or to groups. Where distribution is to occur to individuals, the sponsor is able to determine how many papers each student will review and to choose random or manual distribution of papers. Where distribution will occur to groups, the sponsor identifies the groups and then determines the method by which papers are distributed to each group (e.g., manually, randomly, or by exchange between groups).

Before the peer review assignment is created, and before distribution occurs, the sponsor may wish to review each paper submitted to make certain that personally identifiable information is not included in the body of the paper. Assuming anonymity is desired, and any such personally identifying information is removed, the method of distribution can be determined.

For example, in some embodiments, sponsor chooses to have each student review multiple papers, and selects one paper to be randomly assigned to each student, and to allow manual assignment of one paper to each student. Random assignment distributes a paper to the universe of students who are not the author. Likewise, manual selection is controlled to prevent review of a paper by its author and to remove manually selected papers from the universe of papers available for review to insure that all papers receive neither more nor less than the desired number of reviews. This is done by allowing students to select any paper other than their own and papers already selected by others, or by allowing the faculty member to manually assign papers to students.

When a reviewer is ready, the reviewer is presented with a selection of all paper that are currently available for review (e.g., completed papers, papers of students that have dropped the class, papers that have been manually assigned to other reviewers and the like). This "on demand" paper distribution algorithm is useful in the successful assessment of paper assignments.

The sponsor also determines whether or not a grade is given and/or who has access to the grade received by any paper.

In some embodiments, keywords are provided to enable the sponsor to access questions and rubrics stored in the library. The sponsor selects or creates criteria, such as topical questions to be answered by the reviewer, and the minimum length, if any, for the response. The topic question is also created by the sponsor or selected from one or more libraries of topic questions. In some embodiments, the system allows sponsors to add questions to a library. For example, the sponsor may wish to add standard questions used in the past by the sponsor, or questions recommended by a textbook publisher, or state or district educational authority. The sponsor is given the choice to share such questions or rubrics with other sponsors.

Stored topic questions are conveniently categorized into sublibraries directed to such areas as thesis/introduction, organization, style, grammar/mechanics, evidence, conclusion, and general, with each sublibrary accessible by selecting the appropriate icon. When a desirable topic question is located, it is used in the assignment by selecting or clicking on the "check" icon to the right of the question to be added. When the sponsor creates a new topic questions, the library is optionally supplemented by adding the new topic questions.

The sponsor establishes yet other criteria in the form of rubrics for rating selected aspects of the paper. A rubric is a question which asks the reviewer to rate an aspect of the paper on a defined scale, for example: "From 0 to 5 rate the student's effectiveness in identifying the principal leadership characteristics of Napoleon Bonaparte." In some embodiments, a library of stored rubrics is accessible to the sponsor by selecting the rubric library icon. Where a sponsor creates a new rubric, the library is then supplemented by adding the newly-created rubric.

The final step allows the sponsor to review all the criteria for the peer review assignment, and to make any changes needed, before selecting the "submit" icon to create the peer review assignment.

Once the "submit" icon is selected, the Assignments page is updated, for example by adding the newest assignment to the bottom of the list. Alternatively, it is possible to update or supplement the assignment page by adding the newest assignment to the top of the list of assignments, or by sorting alphabetically, by end date, by start date, or by any other sortable criteria. This screen also allows the sponsor to create a manual paper exchange for peer review purposes, by selecting a pencil icon under the column marked "exchange". When this icon is clicked, the "exchange" screen shown is accessed.

Using the "exchange" screen, the sponsor manually assigns for review specific papers to specific students. The sponsor needs only select a paper then click the update icon next to the name of the student he wishes to review the selected paper. The number of the paper then appears in the "reviewing" box next to the student's name. The "x" appearing in the box identifies a random paper distribution assignment to be made by the system. In the event of manual assignment, the system for randomly assigning papers eliminates both the manually assigned paper, as well as any papers authored by the reviewer, from the universe of papers to be randomly assigned, to prevent possible duplication (e.g., a reviewer being assigned the same paper twice, or a paper authored by the reviewer). In some embodiments, manual assignment of papers to review through the "exchange" screen takes place prior to the "start" date selected for the assignment. Once an assignment is made, the information identifying the assignment is posted to a central class or project calendar accessible to all relevant users. The central calendar is also used to provide other information or links such as, for example, scheduling information, holidays, office hours, lecture notes, examinations, tests and quizzes, announcements, and the like. For convenience, this page is accessible from other pages in the sponsor/faculty user class interface by selecting the "calendar" class account navigation bar icon.

The status of the peer review assignments is viewed by selecting the "peer review" account navigation bar icon to access the page. This page allows the sponsor to read student papers, view peer review summary statistics and grades, and to read the reviews of the papers. In some embodiments, this page identifies each paper to be reviewed and the author of each paper, along with the due date and posting date. When a review is posted/uploaded, the number of reviews posted to date is shown for each paper, as is the score or average score if more than one review has been posted. When all reviews have been posted, a grade is also assigned based on predetermined criteria. In some embodiments, an icon is activated when a review is posted which permits the sponsor to read all reviews which have been posted. In addition, the sponsor may also create a review of the paper by selecting the pencil icon in the "post review" column.

When the sponsor wishes to review a selected paper, the pencil icon in the "post review" column of the page is clicked on to access the page that can provide questions and rubrics which are identical to those being used by the other reviewers or it can be customized to provide other questions and rubrics. In addition, short adjectives or phrases, such as, for example, "thoughtful" "concise" "incomplete" "disorganized" etc. can be provided by the sponsor to describe his or her overall impression of the paper. This field could also, if desired, be provided to the other reviewers. In some embodiments, an optional field is also provided which enables the sponsor to enter a grade for the paper. Upon completion of the review, the sponsor selects the "submit" icon to update and return to the prior screen.

The sponsor can read the submitted reviews by clicking the icon in the "read" column This accesses a peer review page which shows relevant summary information relating to all reviews such as, for example, the average score by rubric, reviews which have been posted, the individual score by each reviewer, comments by each reviewer, the identity of each reviewer, and a link to the full text of each review showing the responses to the topical questions and rubrics. The full text of each review, also generally provides a link (shown at the top of the page) to enable the sponsor to read the paper, as well as the option of hiding the review, if desired, so that it is not disclosed to the students.

The system also allows sponsors to establish their preferences by selecting the account navigation bar icon marked "preferences." Global preferences for the user interface, such as, for example, the color of the command bar, the homepage name and address of the sponsor, the number of items to be displayed on a page, whether detailed page descriptions should be shown, etc., can be selected or changed. Additionally, preferences for each class or project are also be provided, such as, for example, the name and address for each class homepage, others who can view the work of submitters, what documents will be accessible to the submitters, etc.

Finally, in some embodiments, a "help!" icon is provided on the system navigation bar which provides information to help the user navigate the system. Pop up help screens are also used throughout the system where appropriate. For example, the first time a sponsor creates a peer review assignment, a screen pops up to ask the sponsor if he or she wishes to review the tutorial.

III. Originality Analysis Module

In some embodiments, when a student paper is submitted in response to an assignment (e.g., by uploading it to the central database), originality can be determined by performing an originality analysis. The sponsor can initiate this process by selecting the account navigation bar icon "turn it in!" and selecting papers which have been submitted for originality analysis.

Originality analysis is a process which typically consists of producing a digital fingerprint for the paper, and comparing the paper's digital fingerprint to the digital fingerprints of term papers and documents stored in a database or gathered from the Internet. Documents having digital fingerprints identified as a close match are then compared full-text to the full-text paper to determine the level of duplication. An originality report can be created which includes a graphical indication of the likelihood of originality ("overall similarity index" ranking originality from 1 (least similar) to 5 (most similar)) and provides links to documents which contain matching passages, to enable the sponsor to view the flagged passages and make a judgment on whether plagiarism has occurred. In addition, textual passages in the paper for which matches were found are identified.

In some embodiments, the originality checking offers the options of excluding small matches (e.g., words of a % overlap).

In some embodiments, areas of overlap (e.g., indicating potential plagiarism) are highlighted in an image (See e.g., Section V below).

IV. Contextual Markup

In some embodiments, the systems and methods of the present invention are used by reviewers who are commenting on formatted text documents. Such uses include any that involve contextually marking of a formatted object, including, but not limited to, a grant review process, a journal review process, a peer review (See e.g., Section II above) and an editor making changes to any type of formatted material (including images such as marketing material or music, or an accountant commenting on a spreadsheet of numbers and graphs).

In embodiments, where the submitted documents are textual documents, the system converts the formatted documents into a series of images prior to contextual markup. This step accounts for the lack of uniform display of formatted text (e.g., from a word processor) within a web browser. After the conversion, those images then retain all of the formatting from the word processor and is displayed in a web browser.

In some embodiments, the objects requested for contextual markup are delivered to the people who will markup those objects.

In some embodiments, where the reviewer is marking up images and not text, there may be a bandwidth cost associated with downloading every manuscript page image every time a change is made to that page. Thus, in some embodiments, for that reason, the systems of embodiments of the present invention allow the user to add their marks to a virtual document that maps exactly onto each image of each page of the manuscript. This means that the user only needs to download each manuscript image once, because their web browser will then cache or store those images. When a mark is added to the manuscript, it appears directly on top of the manuscript image without any modifications to the manuscript image itself.

When the user selects a manuscript for contextual markup, they are sent into a contextual markup system. Marks are placed directly onto the formatted version of the manuscript and they are linked to commentary and/or rubrics.

Libraries of rubrics (e.g., that are used to evaluate submitted works) are managed from a "rubric library" page. From this page, users add rubrics to a particular library, delete rubrics from various libraries, move rubrics between libraries and confirm customized symbols for rubrics.

Contextual markup is also used as an adjunct to the peer review process. For example, when a reviewer is answering a static question, they refer to symbols placed in a manuscript from within their answer. In some embodiments, peer reviewers add comments using the contextual markup system.

When grades, scores, etc. are associated with a submitted object, in some embodiments, that information is managed and accessed via a centralized gradebook.

In some embodiments, the systems and methods of the present invention are provided as an application service provider (ASP) (e.g., accessed by users within a web-based platform via a web browser across the Internet; is bundled into a network-type appliance and run within an institution or an intranet; or is provided as a software package and used as a stand-alone system on a single computer).

V. Layered Modules

Embodiments of the present invention provide systems (e.g., computer processors and computer memory) and methods for layering the above described modules on one image document displayed on a display screen. As shown in FIG. 1, in some embodiments, a document being reviewed is displayed on the screen. In some embodiments, the document appears to be text and are highlighted and marked but is still an image that cannot be edited. All of the layered markup and highlighting maps onto image file and is displayed on the screen.

In some embodiments, passages identified in the originality checking module are highlighted on the document. In some embodiments, glyph aware highlighting is utilized to highlight sections identified using the originality checking module. A database of the document is utilized to map the highlighting to the document image. Glyph aware highlighting associates glyphs with images using the pixel coordinates of the image which maps to the text database of the document. Glyp aware highlighting offers the advantages of being scalable and supporting multiline and multipage highlighting, as well as highlighting across headers, footers, footnotes, etc.

In some embodiments, comments (e.g., from peer or other reviewers) are displayed overlayed with the document. In some embodiments, comments are tied to highlighting. In some embodiments, text comments are saved as quick marks.

Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

We claim:

1. A system for document analysis, comprising a processor and software configured to a) receive textual documents over an electronic communication network and convert textual documents into image files, identify text in said image files, wherein said text is mapped to the document image using a database comprising text of the document; b) permit a user to add contextual markups to said image files wherein said contextual markups are images or HTML tags that are added to an invisible image that maps exactly onto each image of said image file, and wherein said image file is not modified, c) generate an originality report, wherein said generating said originality report comprises the step of highlighting said sections of said image file identified in the originality report as allegedly containing plagiarized text, wherein said highlighting is glyph aware highlighting that associates glyphs with images using the pixel coordinates of the image, which maps to a text database of said document; and d) display said image file on a display screen, wherein said image file simultaneously displays said contextual markups and said highlights.

2. The system of claim 1, wherein said processor or software is further configured to store information pertaining to said received document in a database.

3. The system of claim 2, wherein said information is selected from the group consisting of identity of submitter, grade information, editorial comments, editorial rubrics, questions, and answers.

4. The system of claim 1, wherein said documents are selected from the group consisting of assignments, students' manuscripts, grant applications and journal manuscripts.

5. The system of claim 1, wherein said contextual markups are selected from the from group consisting of editorial comments, peer reviewer comments, corrections, annotations, rubrics, symbols and comments added by said user.

6. The system of claim 1, wherein said highlighting scales with zooming.

7. The system of claim 1, wherein said highlighting is added across multiple lines or pages.

8. A method for generating contextual markups of formatted documents, comprising:
   a) inputting a document into a system for document analysis, comprising a processor and software configured to a) receive textual documents over an electronic communication network and convert textual documents into image files, identify text in said image files, wherein said text is mapped to the document image using a database comprising text of the document; b) permit a user to add contextual markups to said image files wherein said contextual markups are images or HTML tags that are added to an invisible image that maps exactly onto each image of said image file, and wherein said image file is not modified, c) generate an originality report, wherein said generating said originality report comprises the step of highlighting said sections of said image file identified in the originality report as allegedly containing plagiarized text, wherein said highlighting is glyph aware highlighting that associates glyphs with images using the pixel coordinates of the image, which maps to a text database of said document; and d) display said image file on a display screen, wherein said image file simultaneously displays said contextual markups and said highlights;
   b) adding contextual markups to said image document;
   c) generating an originality report and highlighting sections of said image file that allegedly contain plagiarized text using said glyph aware highlighting; and
   d) displaying said image containing said highlighting and said contextual markups, wherein said glyph aware highlighting and said contextual markups are displayed simultaneously.

9. The method of claim 8, wherein said processor or software is further configured to store information pertaining to said received document in a database.

10. The method of claim 9, wherein said information is selected from the group consisting of identity of submitter, grade information, editorial comments, editorial rubrics, questions, and answers.

11. The method of claim 8, wherein said documents are selected from the group consisting of assignments, students' manuscripts, grant applications and journal manuscripts.

12. The method of claim 8, wherein said contextual markups are selected from the from the group consisting of editorial comments, peer reviewer comments, corrections, annotations, rubrics, symbols and comments added by said user.

13. The method of claim 8, wherein said highlighting scales with zooming.

14. The method of claim 8, wherein said highlighting is added across multiple lines or pages.

* * * * *